United States Patent [19]

Lee

[11] 4,048,283
[45] Sept. 13, 1977

[54] REMOVAL OF HEAVY METALS FROM AQUEOUS SOLUTIONS

[75] Inventor: John Malcolm Lee, Lake Jackson, Tex.

[73] Assignee: The Dow Chemical Company, Midland, Mich.

[21] Appl. No.: 693,048

[22] Filed: June 4, 1976

[51] Int. Cl.$^2$ .............................................. C01G 37/14
[52] U.S. Cl. ....................................... 423/92; 210/50; 210/53; 423/158; 423/164; 423/184; 423/198; 423/595; 423/607; 423/633
[58] Field of Search .................. 423/92, 595, 58, 607, 423/140, 633, 158, 164, 184, 198; 210/50, 53

[56] References Cited

U.S. PATENT DOCUMENTS

| 305,389 | 9/1884 | Hore | 423/595 |
|---|---|---|---|
| 305,391 | 9/1884 | Hore | 423/595 |
| 868,807 | 10/1907 | Potter | 423/58 |
| 1,225,374 | 5/1917 | Toabe | 423/58 |
| 1,784,950 | 12/1930 | Udy | 423/607 |
| 2,285,115 | 6/1942 | Gans et al. | 423/595 |
| 3,616,344 | 10/1971 | Peterson et al. | 423/607 |

FOREIGN PATENT DOCUMENTS

| 2,424,328 | 12/1974 | Germany | 423/607 |
|---|---|---|---|
| 2,152,331 | 4/1972 | Germany | 423/607 |
| 100,300 | 3/1916 | United Kingdom | 423/595 |

Primary Examiner—O. R. Vertiz
Assistant Examiner—Wayne A. Langel
Attorney, Agent, or Firm—Walter J. Lee

[57] ABSTRACT

Aqueous process streams or waste waters destined for merging with public waters sometimes contain deleterious amounts of heavy metals, e.g., lead (Pb) compounds. The heavy metal compounds may be substantially removed or reduced to harmless levels by treating the acidic aqueous streams with chromate or dichromate ions, then heating the solution to oxidize organics and/or heavy metal-organics, then raising the pH to an alkaline pH to precipitate the heavy metal chromate, and separating the heavy metal chromate from the aqueous stream.

12 Claims, No Drawings

REMOVAL OF HEAVY METALS FROM AQUEOUS SOLUTIONS

BACKGROUND OF THE INVENTION

Some aqueous process streams or waste water streams contain heavy metal values, e.g., Pb, in solution. Such heavy metal values are often deleterious in subsequent processing of the aqueous stream. If the aqueous stream is a waste water stream destined for merging with public waters, the heavy metal may pose an ecological or environmental problem. Government regulations have been established, setting very low acceptable levels of heavy metals, e.g., Pb, in waste streams destined to merge with public waters. Pb values are present, for example, in aqueous streams rich in $MgCl_2$ which emerge from the production of Grignard reagents.

There is a need, then, for a method of substantially removing heavy metals, such as Pb, from aqueous solutions.

It is an object of the present invention to provide for removal of heavy metal values from aqueous streams.

It is a further object to provide a method for substantially removing heavy metal values from aqueous alkali metal or alkaline earth metal salt solutions.

Another object is to provide a method for removing heavy metal values from aqueous $MgCl_2$ solutions destined for use as a feed material for other processes which require Mg values, or else are destined for merging into public waters, such as bays or estuaries.

Yet another object is the removal of Pb values from $MgCl_2$ brine which emerges from a process in which Grignard compounds are made.

These and other objects are attained by the invention disclosed herein.

SUMMARY OF THE INVENTION

Aqueous solutions containing heavy metal values, such as Pb, are intimately contacted with chromate or dichromate ions under conditions conducive to oxidation of any organics and the compounds containing heavy metal values, then raising the pH to above about 7.0 by adding $\overline{OH}$ ions thereby precipitating Pb chromate, then separating the precipitate from the aqueous solution.

DETAILED DESCRIPTION OF THE INVENTION

Generally speaking, the present invention comprises a method for substantially removing heavy metal values, such as Pb, from aqueous solution by adding soluble chromate (or dichromate) ions to the solution in an amount sufficient to react with the heavy metal compounds, then subjecting the solution to conditions conducive to cause oxidation of any organics and compounds containing the heavy metal compounds, then raising the pH to above about 7.0 by the addition of soluble caustic ($\overline{OH}$ ion source) thereby causing precipitation of heavy metal chromate, and then separating the precipitate from the aqueous medium.

As used herein, the term "chromate" or "chromate ion" includes dichromates as well as chromates such as are obtained by dissolving a soluble metal chromate or dichromate in aqueous solution. Potassium chromate ($K_2CrO_4$), potassium dichromate ($K_2Cr_2O_7$), magnesium chromate ($MgCrO_4$) and magnesium dichromate ($MgCr_2O_7$) are examples of chromates operable in the present invention. Chromates and dichromates of other alkali metals or alkaline earth metals, such as Li, Ca, Na and Be are also operable. Chromic acid ($H_2CrO_4$) may be used, but because of handling problems, is not generally preferred. The potassium chromates are generally preferred; they are not difficult to handle and are readily and economically available. The chromates and dichromates are known to be oxidizing agents.

The aqueous solutions within the purview of the present invention are those which contain deleterious amounts of heavy metal ions such as Pb, Fe, Cr, or Ag. Of special interest are metal salt brines, such as aqueous $MgCl_2$. In a particular preferred embodiment there is used a $MgCl_2$ brine containing Pb values which emerges from a process in which Grignard compounds (RMgCl where R=alkyl) are made. This $MgCl_2$ brine may in some instances be destined for use as a process stream to subsequent chemical processing or may be destined to merge with public waters as a waste stream. In either case, the substantial removal of Pb values is desired.

The OH ions employed in the present invention to raise the pH may be any water-soluble metal hydroxide, with NaOH or KOH being preferred. NaOH is readily and economically available in large quantities, and is the most preferred. Lime (CaO) will hydrate to form $CaO.H_2O$ (or $Ca(OH)_2$) in water and will raise the pH but tends to precipitate as $Ca(OH)_2$ if the pH reaches about 7.4 or higher; likewise $Mg(OH)_2$ precipitates from alkaline solutions at a pH from about 7.4 or higher so "causticizing" with MgO or dolime (CaO.MgO) is not generally preferred unless the aqueous medium already contains Mg or Ca ions which are desired to be kept in solution. The operation of the present invention requires raising the pH from acidic up to about 7.0 or more, but if one employs an alkaline earth metal hydroxide (or hydrated alkaline earth metal oxide) care should be exercized to avoid going above about 7.4. Furthermore, if the brine itself contains alkaline earth metal salts, such as $MgCl_2$ or $CaCl_2$, then raising the pH above about 7.4, even using a completely soluble caustic, such as NaOH or KOH, can cause precipitation of $Ca(OH)_2$ or $Mg(OH)_2$ and it is likely that such precipitation would need to be avoided in those instances in which the Mg and/or Ca is desired to be kept in solution.

Thus, there are embodiments of the present invention wherein the precipitation of the heavy metal chromate is preferably done within a limited pH range between about 7.0 and about 7.4, most preferably about 7.2 ± 0.1. In those embodiments in which precipitation of alkaline earth metal hydroxides is not a problem and avoidance of such precipitation is not required, then such close control of pH is not necessary and the pH can be raised to above about 7.0 without taking precaution to keep it below 7.4. At higher pH's (about 7.4 or more) the heavy metal chromates are more efficiently precipitated and the need for excess amounts of chromate/heavy metal is lessened.

In obtaining oxidation of the heavy metal compounds such as Pb compounds, the pH of the solution should be acidic (below about 7.0 pH, preferably below about 6.7 pH). It is preferred to employ HCl as the acidifier, though other acidifiers will work. Organic acids are not normally preferred as acidifiers because the carbonaceous material would tend to compete with the heavy metal compounds in the oxidation step, thus requiring an excess of oxidizer (chromate ion) beyond that required by the heavy metal compound. Furthermore, organic acids are not generally as economial as HCl.

Other mineral acids may be used, but where the aqueous solution being treated is a brine (metal chloride) material, it is generally best not to introduce different cations than are already present, viz chloride ions.

The oxidizer (chromate ion) is preferably added in an amount which is at least the stoichiometric amount for oxidizing all the heavy metal compound. Most preferably, the oxidizer is added in an excess of about 1.5 to about 4.0 times the stoichiometric amount. The heavy metal compound may, in some cases, be an organometallic compound, such as Pb alkyl, and the organic portion of the compound may compete for the oxidizer ions and it is desired that there be at least an amount of oxidizer present to satisfy all the competing oxidation reactions.

The oxidation rate and extent of oxidation is largely temperature dependent, thus it is preferred to heat the aqueous solution to effect feasible rates of oxidation. Temperatures above ambient, preferably above about 40° C, most preferably above about 60° C are employed. Temperature should be kept at less than boiling point to avoid use of pressurized equipment. If the oxidation step is being done in a location where speed of oxidation is not as necessary as conservation of heat energy, then ample time of oxidation must be provided in order to effect a sufficient or substantial amount of heavy metal removal.

After the oxidation step, the aqueous solution is brought to a pH of about 7.0 or more by addition of $OH^-$ ions, thereby causing precipitation of the heavy metal chromate. As stated previously, the pH is preferably adjusted to about 7.2 ± 0.1.

The precipitated heavy metal chromate, such as Pb chromate, is separated from the aqueous medium by any convenient means, such as settling, filtration, centrifugation or flocculation/settling. Preferably the precipitate obtained in a large scale operation is separated by settling with a polishing filtration step.

In those instances in which excess chromate is employed, some chromium values remain in the aqueous medium after the heavy metal chromate has been removed. The chromium values may require substantial removal and this is accomplished by adding $Fe^{++}$ ions, e.g., ferrous sulphate or ferrous chloride such as $FeCl_2 \cdot 4H_2O$, to the solution; this drops the pH into the acid range and reduces the chromium to the $Cr^{3+}$ state. In some cases it may be advisable to avoid the use of a sulphate because it may be an interfering ion. Following this, the pH is again raised to alkaline and the chromium and iron separated as insoluble hydrates. Here again, if the aqueous medium contains alkaline earth metal values (such as Mg or Ca) which are desired to be kept in solution, then the pH should be kept below about 7.4, preferably about 7.2 ± 0.1.

The following examples demonstrate a preferred application of the invention. A practitioner of the relevant arts, having learned of this invention, will be able to apply the invention in other embodiments without departing from the spirit and scope of the present invention.

EXAMPLE 1

To an acidic 25% $MgCl_2$ solution, which contained 400 ppm Pb (100 gram solution), was added 0.058 gram (twice equivalent to Pb as needed to form $PbCrO_4$) of $K_2Cr_2O_7$. The solution was heated to 60° C for 15 minutes with stirring, the pH adjusted up to 7.2 by adding aqueous NaOH, with stirring, and the precipitate (analyzed as $PbCrO_4$) which formed was filtered out using a fritted glass filter. To the filtrate was added 0.32 gram of $FeCl_2 \cdot 4H_2O$; this dropped the pH to acidic range. It was stirred and the pH was raised to 7.2 using aqueous NaOH and the ppt which formed (Cr hydrate and Fe hydrate) was filtered out. On a 100% $MgCl_2$ basis, the $MgCl_2$ solution now contained 150 ppm Pb, less than 10 ppm Cr, and about 80 ppm Fe.

EXAMPLE 2

In this set of runs the $MgCl_2$ brine is at a pH of about 0.5 (very acid); at this low pH most of the chromium is present as dichromate (literature equilibria data) regardless of whether a chromate or dichromate is introduced. The chromate or dichromate (i.e., $MgCrO_4$ or $K_2Cr_2O_7$) dissolves readily. After the chromate is added, the solution is heated to about 90° C for about 0.5 hour to assure substantially complete oxidation of organic Pb which is present in the $MgCl_2$ brine. The pH is raised to 7.1-7.2 by adding $OH^-$ ion (NaOH) with stirring. At this pH $PbCrO_4$ precipitates and is removed by filtering or settling. The efficiency of Pb removal is a function of chromate/Pb concentration, thus and excess of chromate is ordinarily preferred even though the excess chromium may then need to be substantially removed by adding $Fe^{+2}$ and more $OH^-$. Stating it another way, it can be said that since the dichromate-chromate equilibrium is pH dependent, excess is necessary to have enough precipitate a substantial portion of the Pb at a pH of about 7.2. (Precipitation of $PbCrO_4$ may be aided by adding seed crystals at the precipitation pH.)

The following Table I gives data for the runs of this example. The brine employed is 100 grams of 25% $MgCl_2$ solution containing 400 ppm Pb. This calculates to be 1600 ppm Pb on 100% $MgCl_2$ bases. Analyses is made of the brine after treatment.

TABLE I

| Run No. | Chromate added | Mole Equiv. added | Emission Spectroscopy Analysis after Treatment 100% $MgCl_2$ basis | | | Remarks |
|---|---|---|---|---|---|---|
| | | | Pb | Cr | Fe | |
| 1 | $MgCrO_4$ | 1 | 700 | 110 | N.A.* | |
| 2 | $MgCrO_4$ | 2 | 360 | 220 | N.A. | |
| 3 | $K_2Cr_2O_7$ | 1 | 490 | 160 | N.A. | |
| 4 | $K_2Cr_2O_7$ | 2 | 200 | 280 | N.A. | |
| 5 | $K_2Cr_2O_7$ | 2 | 160 | 290 | 9 | |
| 6 | $K_2Cr_2O_7$ | 2 | 150 | <10 | 26 | reheated brine after filtering out $PbCrO_4$, added $Fe^{2+}$ and brought pH to 7.2 and refiltered. |
| 7 | $K_2Cr_2O_7$ | 2 | 160 | <10 | 80 | same as 6 except brine was not reheated |
| 8 | $K_2Cr_2O_7$ | 2 | 130 | N.A. | N.A. | re-heat at 90° C |

TABLE I-continued

| Run No. | Chromate added | Mole Equiv. added | Emission Spectroscopy Analysis after Treatment 100% MgCl₂ basis | | | Remarks |
|---|---|---|---|---|---|---|
| | | | Pb | Cr | Fe | |
| | | | | | | for 30 min., add Fe²⁺ and OH to pH 7.2 and refilter. |

N.A. = not analyzed.

EXAMPLE 3

The data in following Table II were obtained by adding various amounts of $K_2Cr_2O_7$ to 100 gms of a $MgCl_2$ brine, heating to 95° C for 1½ hours, cooling, adjusting the pH to 7.2 by adding NaOH, stirring for 2 hours and then, after standing overnight, filtering through a medium glass frit. The $MgCl_2$ brine at the start was acidic and contained 25% by weight of $MgCl_2$ and 400 ppm Pb. This amount of Pb is equal to 1600 ppm Pb on 100% $MgCl_2$ basis. Analysis is obtained by emission spectroscopy.

TABLE II

| Run No. | gm wt. of $K_2Cr_2O_7$ | Mole $K_2Cr_2O_7$ /Mole Pb | ppm Pb in product 100% MgCl₂ basis |
|---|---|---|---|
| 1 | 0.0684 | 1.2/1 | 120 |
| 2 | 0.1199 | 2.1/1 | 110 |
| 3 | 0.2189 | 3.86/1 | N.D.* |
| 4 | 0.4375 | 7.7/1 | N.D. |
| 5 | 0.9409 | 16.6/1 | N.D. |

*N.D. = not detectable. The analytical method will not detect less than 20 ppm, so the samples are less than 20 ppm.

The invention is limited only by the following claims.

I claim:

1. A process for removing organic Pb compounds from an aqueous brine solution, the said process comprising,
   providing an acidic aqueous brine solution containing organic Pb compounds,
   adding to said solution chromate or dichromate ions in an amount sufficient to oxidize at least a substantial portion of said organic Pb compounds,
   subjecting the solution to a temperature above ambient temperature but below boiling temperature for a time sufficient to cause oxidation of the organic Pb,
   raising the pH of the solution to a pH of at least about 7.0 by adding OH⁻ ions thereto, thereby causing precipitation of Pb chromate, and
   separating the precipitate from the solution.

2. The process of claim 1 wherein the chromate or dichromate is supplied as a chromate or dichromate salt of an alkali metal or alkaline earth metal.

3. The process of claim 2 wherein the alkali metal or alkaline earth metal is Na, K, Ca, Mg or Li.

4. The process of claim 1 wherein the chromate or dichromate ions are in an amount greater than the stoichiometrical amount required to oxidize all the organic Pb.

5. The process of claim 4 wherein the amount of chromate or dichromate added is an amount of about 1.5 to about 4.0 times the stoichiometric amount required for oxidation of the Pb values.

6. The process of claim 1 wherein the following additional steps are employed:
   treating the aqueous solution, after the Pb chromate has been separated, with ferrous ion, Fe⁺⁺, in a form which lowers the pH to acid, thereby reducing any residual chromium values to Cr⁺⁺⁺,
   adding more OH ion to bring the pH back up to above about 7.0, thereby precipitating (Fe(OH)₃ and any Cr(OH)₃ that may be present, and
   separating the precipitate from the aqueous solution.

7. The process of claim 6 wherein the ferrous ion, Fe⁺⁺, is supplied as hydrated ferrous chloride.

8. The process of claim 1 wherein the temperature is above about 40° C, but is less than the boiling temperature of the solution.

9. The process of claim 1 wherein the temperature is above about 60° C, but is less than the boiling temperature of the solution.

10. The process of claim 1 wherein the aqueous solution contains $MgCl_2$.

11. The process of claim 1 wherein the pH is adjusted to about 7.2 ±0.1 to cause precipitation of $PbCrO_4$.

12. A process for removing organic lead values from a $MgCl_2$ brine solution, said process comprising
    providing an acidic $MgCl_2$ brine solution containing organic Pb values,
    adding to said brine an amount of chromate or dichromate which is at least a stoichiometric amount to substantially oxidize the organic Pb values,
    heating the solution to a temperature above about 40° C, but below boiling, for a period of time to effect substantial oxidation of the organic Pb values,
    raising the pH to a value of about 7.2 ±0.1, thereby precipitating $PbCrO_4$,
    separating the $PbCrO_4$ from the solution,
    adding hydrated ferrous chloride in an amount to reduce the residual chromium in the solution to Cr⁺⁺⁺,
    adding OH⁻ ion in an amount sufficient to bring the pH to about 7.2 ±0.1, thereby precipitating Fe(OH)₃ and Cr(OH)₃, and
    separating said FE(OH)₃ and Cr(OH)₃ from the solution.

* * * * *

UNITED STATES PATENT AND TRADEMARK OFFICE
CERTIFICATE OF CORRECTION

PATENT NO. : 4,048,283

DATED : September 13, 1977

INVENTOR(S) : John M. Lee

It is certified that error appears in the above-identified patent and that said Letters Patent are hereby corrected as shown below:

Col. 1, Line 43, please change "$OH^-_v$" to read --$OH^-$--.

Col. 1, Line 58, please change "$OH^-_v$" to read --$OH^-$--.

Col. 2, Line 20, please change "OH" to read --$OH^-$--.

Col. 2, Line 68, please change the word "economial" to read --economical--.

Col. 3, Line 30, please change "$OH^-_v$" to read --$OH^-$--.

Col. 4, Line 36, please change "$OH^-_v$" to read --$OH^-$--.

Col. 4, Line 39, please change the word "and" to read --an--.

Col. 4, Line 45, please insert the word --to-- between the words "enough" and "precipitate".

Col. 5, Line 8, please add --*-- before the abbreviation "N.A.".

Col. 5, Line 46, please change "$OH^-_v$" to read --$OH^-$--.

Col. 6, Line 20, please change "OH" to read --$OH^-$--.

Col. 6, Line 21, please change "$(Fe(OH)_3$" to read --$Fe(OH)_3$--.

UNITED STATES PATENT AND TRADEMARK OFFICE
CERTIFICATE OF CORRECTION

PATENT NO. : 4,048,283
DATED : September 13, 1977
INVENTOR(S) : John M. Lee

It is certified that error appears in the above-identified patent and that said Letters Patent are hereby corrected as shown below:

Col. 6, Line 53, please change "$OH^-_v$" to read -- $OH^-$ --.

Col. 6, Line 56, please change "FE(OH)$_3$" to read -- Fe(OH)$_3$ --.

Signed and Sealed this

Seventh Day of March 1978

[SEAL]

Attest:

RUTH C. MASON
Attesting Officer

LUTRELLE F. PARKER
Acting Commissioner of Patents and Trademarks